United States Patent [19]
Otto

[11] 3,915,026
[45] Oct. 28, 1975

[54] LOBE TYPE PUMP ADJUSTMENT
[75] Inventor: Albert D. Otto, Indianapolis, Ind.
[73] Assignee: Wallace Murray Corporation, New York, N.Y.
[22] Filed: July 29, 1974
[21] Appl. No.: 492,984

[52] U.S. Cl. ................................................. 74/401
[51] Int. Cl.² ........................................ F16H 35/08
[58] Field of Search ............................. 74/401, 400

[56] References Cited
UNITED STATES PATENTS
2,444,773   7/1948   Gondek ............................... 74/401
3,605,516   9/1971   Hausinger ............................ 74/401

*Primary Examiner*—Leonard H. Gerin
*Attorney, Agent, or Firm*—Thomas J. Greer, Jr.

[57] ABSTRACT

A gear mounting arrangement for lobe type air pumps. Angular adjustment between a gear (a form of hub) and its (lobe carrying) shaft permits a desired angular phase adjustment between the intermeshing lobes. The gear moves axially on its shaft and is held in place by positive screw or nut on one face and retained on the other face by a belleville spring. Rotation of the nut causes axial displacement of the gear and consequent phase adjustment.

8 Claims, 5 Drawing Figures

LOBE TYPE PUMP ADJUSTMENT

This invention relates to adjustable gearing and displays particular utility in the art of lobe or rotor type pumps.

As illustrated in U.S. Pat. No. 2,444,773 to Gondek, a lobe-type pump is defined by a chamber in which rotate two intermeshing lobe-type rotors. The intermeshing rotors carry two, three or any desired number of lobes, the rotors turning in opposite directions and being carried by parallel shafts. It is of paramount importance in such pumps that the (angular) phase between the rotors be accurately established and maintained so as to prevent abrasion between the lobe surfaces. One manner of establishing the desired phase, as described in the Gondek patent, is to employ a spline connection between an auxiliary or driven gear and its shaft. The auxiliary and driving gear may be helical gears. A nut and adjustable shims are provided on the shaft which carries the auxiliary gear. With this arrangement, axial movement of the auxiliary gear on its shaft, by changing the shim thickness, will cause the desired phase adjustment between the two lobed rotors. While apparently operable in the manner intended, the Gondek apparatus displays the obvious disadvantage of having to disassemble a portion of the apparatus in order to carry out the phase adjustment.

Other methods of accomplishing similar phase adjustment are known, such as shown by U.S. Pat. No. 2,304,770 to Nichols and U.S. Pat. No. 2,660,115 to Ras. Again, while such prior art constructions have apparently served the purpose intended by their originators, they suffer some disadvantage, such as relative complexity and number of parts required.

According to the practice of this invention, the angular phase between the intermeshing rotors of a lobe-type pump may be adjusted by axial movement of a gear relative to the shaft upon which it is mounted. However, in lieu of shims such as employed in the prior art, one or more belleville springs is employed. The gear is held axially in place by a belleville spring which holds the gear against an adjusting nut. By merely turning the nut relative to its shaft, axial movement of the gear is realized. The gears having helical teeth, the desired phase adjustment is effected. It is also possible to employ helical splines and square gear teeth. With this latter arrangement, axial movement of one of the meshing gears relative to its shaft also effects the desired phase change or adjustment.

Figure 3:
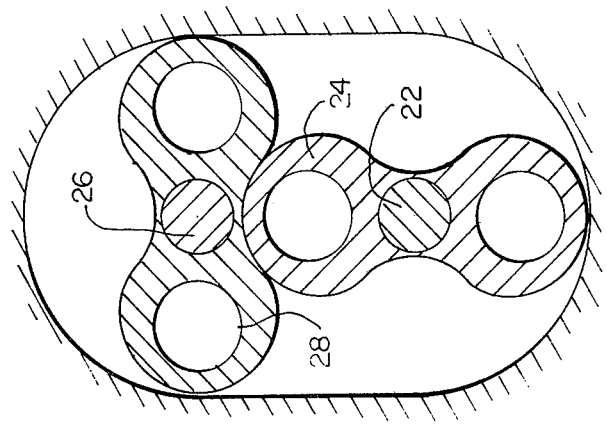
FIG. 3 is a typical cross-section of a lobe type pump such as that of FIG. 1.
Figure 2:
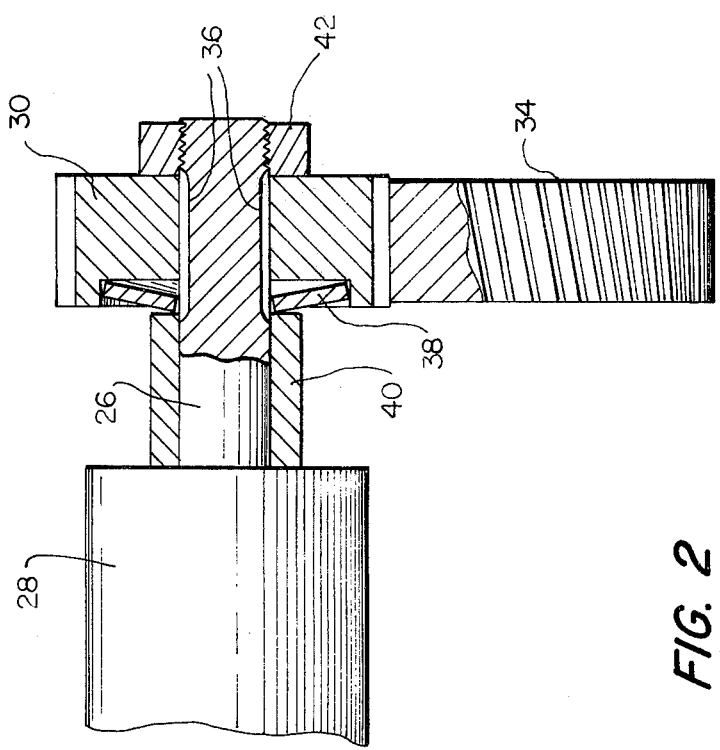
FIG. 2 is an enlarged view similar to a portion of FIG. 1.

Referring now to the drawings, the numeral 10 denotes generally a lobe type pump of conventional construction such as shown in U.S. Pat. No. 2,444,773 to Gondek. The pump includes an outer casing 12 and end closures 14 and 16. The numeral 18 denotes a bearing for input power shaft 22, the latter carrying lobes 24. A parallel, driven shaft 26 carries lobes 28. Meshing gears 30 and 34 are coupled to the ends of shafts 22 and 26. As shaft 22 is turned by a motor or other prime mover, gear 34 attached thereto as by splines 36 turns and meshes with gear 30, turning shaft 26 through splines. Lobes 24 and 28 (note FIG. 3) thus rotate in opposite directions and effect a pumping action in the conventional manner.

The numeral 38 denotes a belleville spring of conventional construction and having its larger diameter in abutting contact with one face of gear 30. A sleeve 40 may extend between lobe 28 and the narrow diameter of the belleville spring, the sleeve 40 surrounding shaft 26. Nut 42 is threaded on the end of shaft 26.

In the illustrated form of the invention, the splines 36 are straight, while the gears 30 and 34 each carry meshing helical teeth. It will be understood, in view of the description which will follow, that the splines 36 may be helical and the meshing teeth of gears 30 and 34 straight or square.

The operation of the device is as follows. The apparatus is assembled with the intermeshing lobes 24 and 28 positioned approximately in the desired phase or angular relationship. The nut 42 is tightened against the force exerted by belleville spring 38 until gear 34 is placed in that axial position along shaft 26 which will yield the desired phase or angular relationship between the lobes 24 and 28. Should the initially chosen phase or anuglar relationship between the lobes change, as for example due to mechanical wear, it is only necessary to adjust the nut 42 so as to cause the auxiliary or driven gear 34 to move axially along a shaft 26 until the desired phase relationship is again realized. In the illustrated embodiment, with splines 36 parallel to the axis of shaft 26, motion of helical gear 34 axially along its shaft will cause rotation of gear 30 with consequent angular adjustment of the rotor lobe carried by shaft 22. In the event that the splines 36 are pitched somewhat at an angle to the axis of shaft 26, i.e., helical splines and spur gears are employed, axial adjustment of gear 34 along the shaft 26 will cause slight rotation of gear 34, causing a corresponding rotation of gear 30 and shaft 22 which carries the other lobed rotor.

Figure 1:
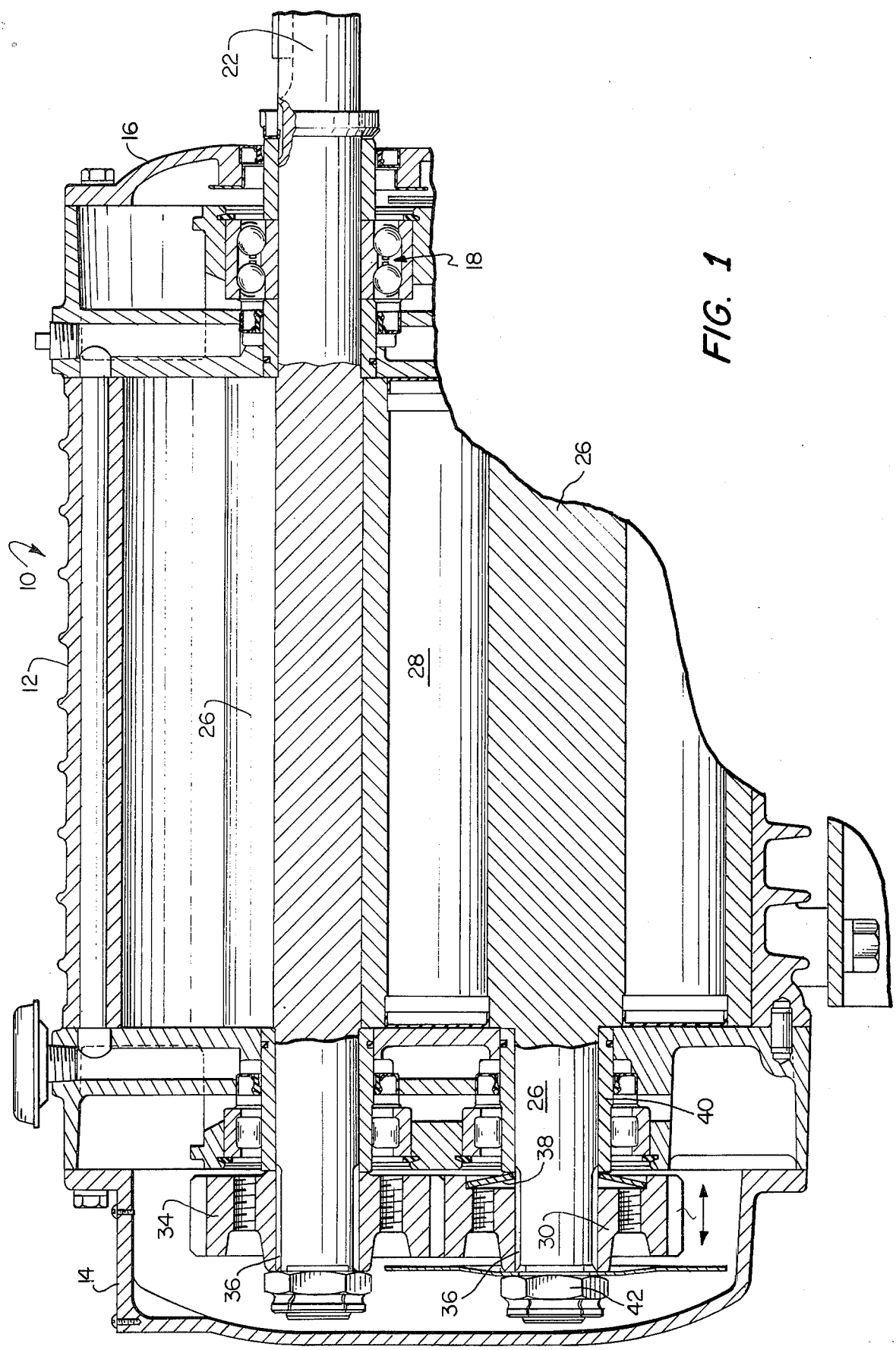
FIG. 1 is a sectional view of a portion of a lobe type compressor illustrating the invention.
Figure 4:
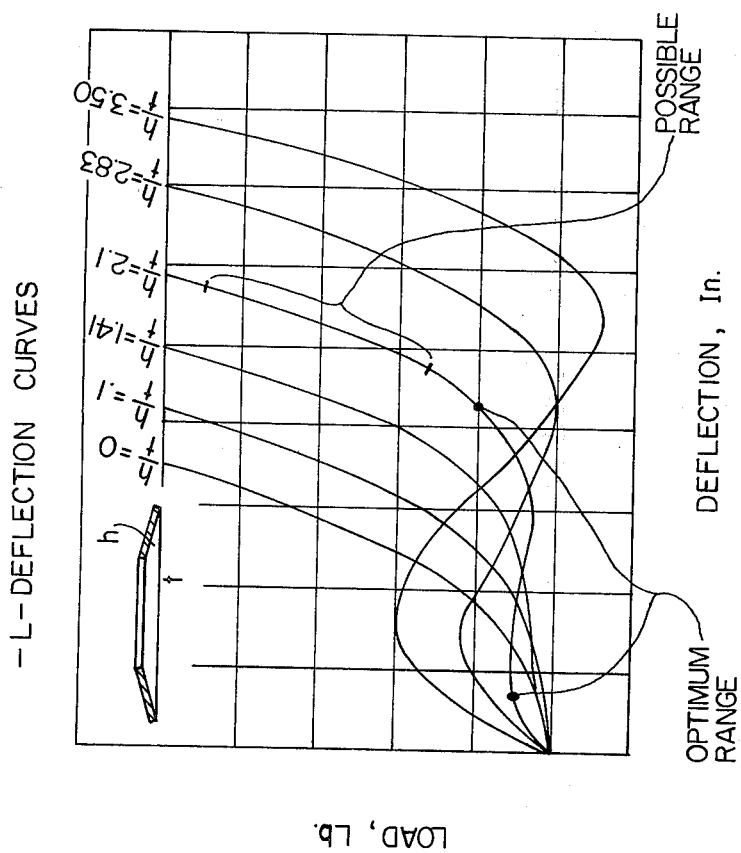
FIG. 4 is a typical set of load-deflection curves for belleville type springs and illustrates how an optimum spring is selected.

Referring now to FIG. 4 of the drawings, a set of typical load-deflection curves is illustrated for belleville type springs. It is seen by the selection of the curve $h/t = 2.1$ a fairly constant spring force is realized over a substantial range. The belleville spring must exert sufficient force that gear 34 is always urged against the side of nut 42. That is to say, the axial force due to the pumping must always be less than the spring force. The spring is also selected to be strong enough to require that the nut be tightened to its normal torque range, thus insuring that the nut will not back off or loosen. The axial position of the gear 34 can be adjusted over the optimum deflection range of the belleville spring 38 without appreciable variation of torque on the nut 42, as indicated by the double headed arrow of FIG. 1. As is well-known to workers in this art, belleville springs can be employed in series or in parallel on any combination to obtain the required force and deflection range for a particular application.

Operation of the belleville spring is possible in three general conditions:

1. Optimum range (FIG. 4).

By selection of $h/t = 2.1$ a fairly constant spring force is realized over a substantial range.

2. In a particular design, spring force for suitable spring size may be too low to give proper nut locking force and/or gear clamping force; then a spring may be used in the linear portion of the curve shown in FIG. 4. Axial adjustment may then be employed with spring force varying between acceptable limits. Springs may be used in series or parallel or combinations of both to obtain required force-deflection characteristics.

Figure 5:
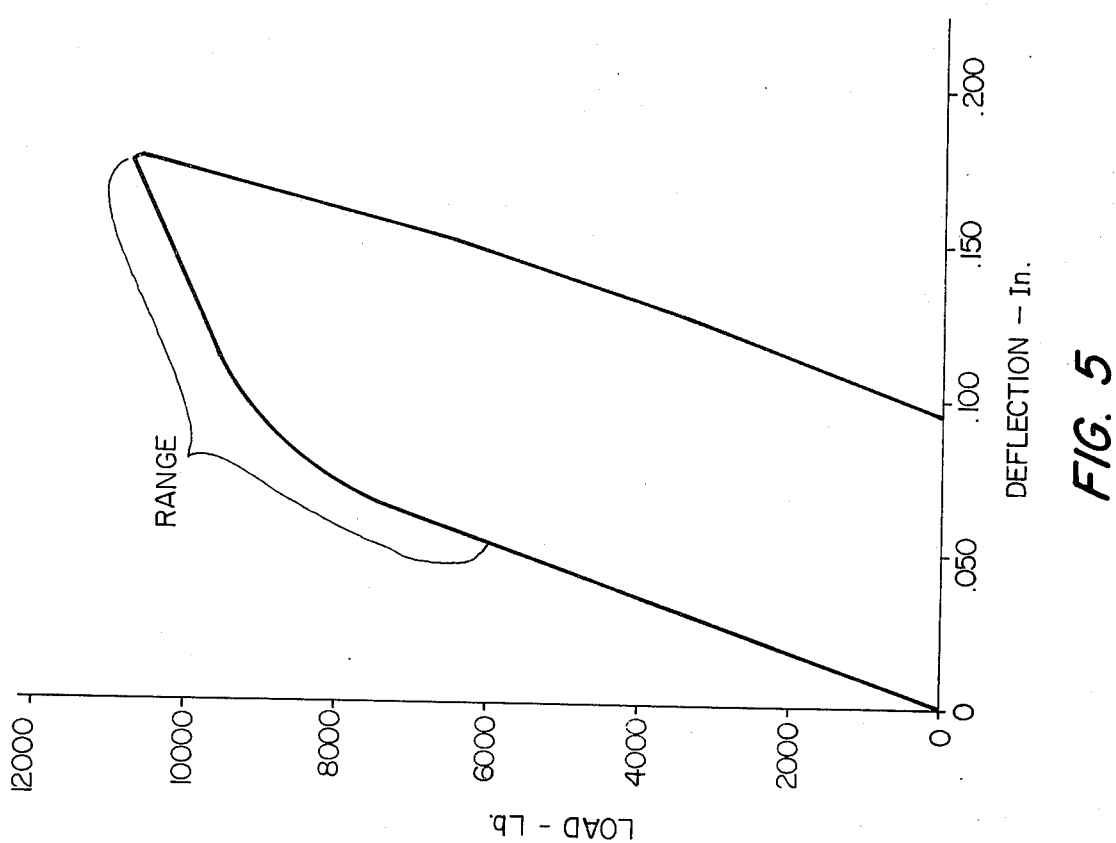
FIG. 5 is a load-deflection curve of a belleville spring when operated along its yield range.

3. A belleville spring suitably tempered, can be deflected beyond its yield point and in effect increase its deflection range, resulting in lower spring cost (see FIG. 5). A precaution must be made to carry out major adjustments in one direction only. A small reverse adjustment is possible.

While illustrated as displaying particular utility in a lobe type pump, it will be apparent that the invention exhibits utility in any application wherein angular phase between a hub and its shaft must be adjusted.

In one example employing the invention, the pump 10 was employed as an air pump and the helix angle of gears 30 and 34 was 19.005°. The outside gear diameter was about 4½ inches. The axial adjustment range of gear 34 was 0.076 inches which allowed a gear tooth to spline tolerance of plus and minus 5 minutes and spline center line to rotor center line of plus and minus 5 minutes. The maximum force exerted by the belleville spring 38 was 9,000 pounds. A tolerance of plus and minus 8 minutes or indexing of gears and plus and minus 5 minutes on rotor center line to spline center line results in a required axial range of the helical gear 34 of approximately 0.099 inches. In another example, the belleville spring 34 was operated in the range shown at FIG. 5. The desired phase between the lobes was fixed when the nut 42 exerted about 6,000 pounds force against the spring. For all subsequent phase adjustments, the nut was turned to further compress the belleville spring up to about 9,000 pounds force. The range was thus in the yield point range of the spring metal, as indicated by the lagging return (hysteresis)-path.

The phase adjustment has been shown with respect to the driven gear 30. However, it could also be made on the driving gear 34.

I claim:

1. A connection between a shaft and a hub for varying the angular phase relation therebetween, said shaft and hub having at least one interengaging spline, an abutment adjustably positioned along said shaft, said abutment contacting one face of said hub, a biasing spring contacting the other face of said hub, said spring being compressed, whereby a spring force urges the hub against the abutment.

2. The connection of claim 1 wherein said spline is at an angle to the axis of said shaft, whereby axial adjustment of said abutment along the shaft causes the hub to rotate relative to the shaft.

3. The connection of claim 2 wherein said abutment is defined by a nut threaded on said shaft.

4. The connection of claim 2 wherein said spring is a belleville spring.

5. The connection of claim 4 wherein the largest diameter of said belleville spring contacts one face of the hub, and wherein a collar is axially fixed relative to said shaft, and the smallest diameter of said belleville spring contacts and abuts one end of said collar.

6. The connection of claim 1 wherein said hub is a gear, and including a second gear secured to a second shaft, said second gear meshing with said first-mentioned gear, said first and second gears having helical teeth, whereby axial movement of the first gear on its shaft rotates the second gear and its shaft.

7. The connection of claim 6 wherein said first and second shafts each carry a plurality of elongated, meshing lobes, whereby adjustment of the abutment along the first-mentioned shaft causes angular phase adjustment between the lobes.

8. The connection of claim 1 wherein said hub carries helical gear teeth on its outer periphery.

* * * * *